Jan. 16, 1951 P. F. G. HOLST 2,538,519

KEYED AUTOMATIC GAIN CONTROL CIRCUIT WITH DOUBLE TIME CONSTANT INPUT VOLTAGE FILTER

Filed June 23, 1949 2 Sheets-Sheet 1

INVENTOR.
PAUL F. G. HOLST

BY Alden D. Redfield
Charles Marshall Hogan
ATTORNEYS

KEYED AUTOMATIC GAIN CONTROL CIRCUIT WITH DOUBLE TIME CONSTANT INPUT VOLTAGE FILTER

Filed June 23, 1949 2 Sheets-Sheet 2

VIDEO AND A.G.C. VOLTAGE

INVENTOR.
PAUL F. G. HOLST
BY
Alden D. Redfield
Charles Marshall Hogan
ATTORNEYS Patented Jan. 16, 1951 2,538,519

UNITED STATES PATENT OFFICE 2,538,519

KEYED AUTOMATIC GAIN CONTROL CIRCUIT WITH DOUBLE TIME CONSTANT INPUT VOLTAGE FILTER

Paul F. G. Holst, Cincinnati, Ohio, assignor to Avco Manufacturing Corporation, Cincinnati, Ohio, a corporation of Delaware Application June 23, 1949, Serial No. 100,795

6 Claims. (Cl. 178—7.3)

The present invention is a novel automatic gain control (AGC) circuit for television receivers.

A number of AGC circuits have been developed, and research in this field has been very active. Such research has been directed to the finding of an efficient AGC system with good brightness stability, freedom from flicker normally caused by line voltage fluctuations, a high degree of immunity from noise interference, and easy adaptability to use in conventional television receivers, with a minimum loss in gain and bandwidth and a minimum cost. The present invention is directed to those objectives.

It is an object of the present invention to provide a fast AGC circuit which reduces and substantially eliminates the effects of fast fading and interference normally caused by passing airplanes.

Another object of the invention is to provide an AGC circuit which maintains the video output signals at an optimum level for sync signal separation.

A particularly important object of the invention is to provide an amplified AGC potential-developing system free from the limitations and disadvantages of conventional direct coupled amplifiers.

An object of the invention is to provide a detector and filter system for developing an AGC voltage proportional to peak IF carrier level, combined with a pulse rectifier system controlled by the first-mentioned voltage to plate-rectify positive pulses of line frequency, thereby to develop a strong amplified AGC potential. Another related object is to utilize the pulse-rectifier for delay purposes. Still another object under this heading is to utilize a convenient source for the line-frequency pulses.

An object of the invention is to provide an AGC system of minimum susceptibility to impulse noise. The invention discloses a system in which line-frequency pulses are rectified to develop the amplified AGC potential, these pulses not being affected by noise and rendering the AGC system insensitive to noise during the relatively long intervals between the pulses. The rectification of the line-frequency pulses is controlled by a rectified potential which is filtered by a double time-constant integration circuit and thereby rendered insensitive to noise.

For a better understanding of the present invention, together with other and further objects, advantages and capabilities thereof, reference is made to the following description of the accompanying drawings, in which there is illustrated a preferred illustrative form of AGC system in accordance with the invention, as embodied in a television receiver.

Figure 1:
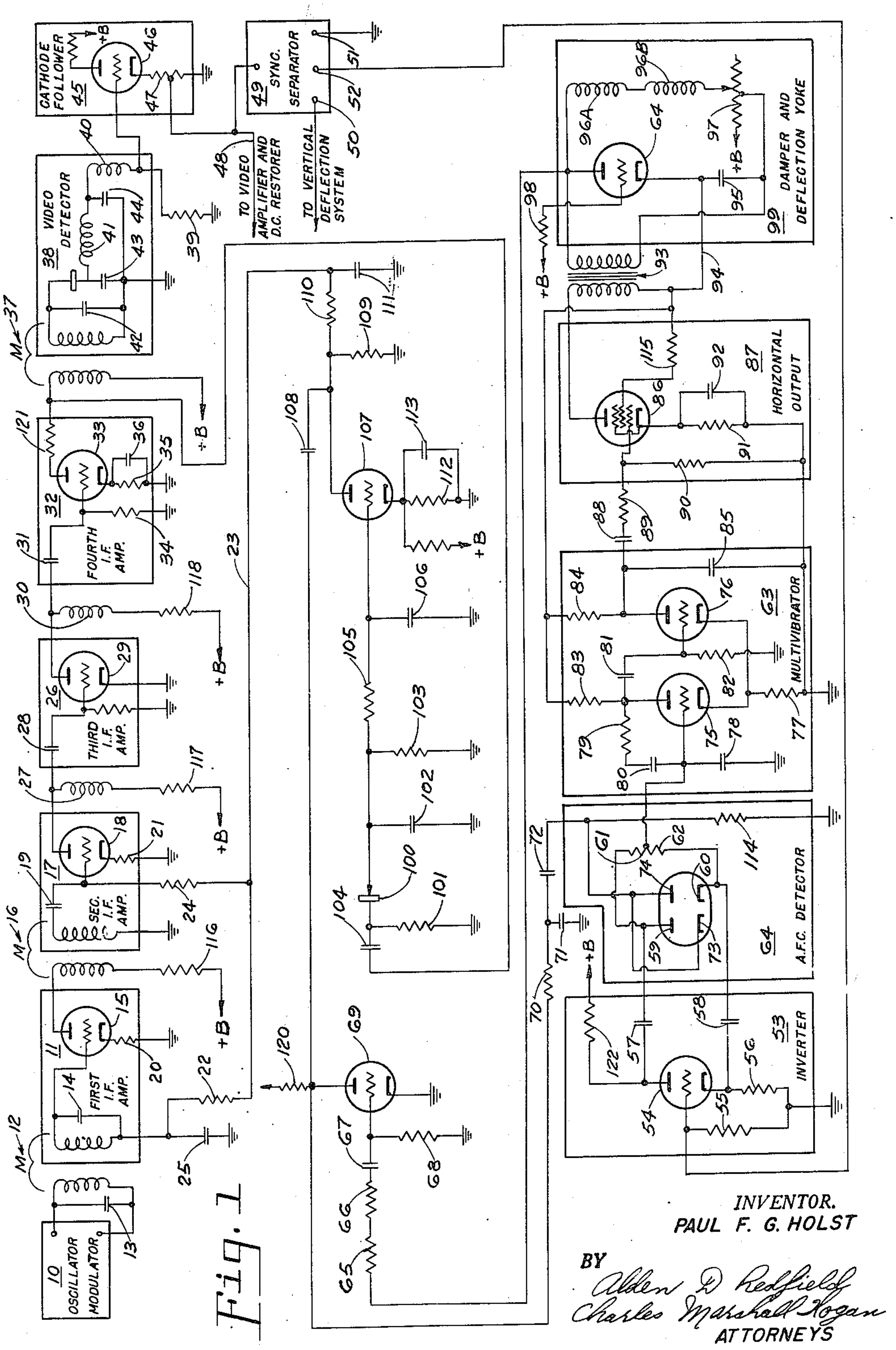
Figure 2:
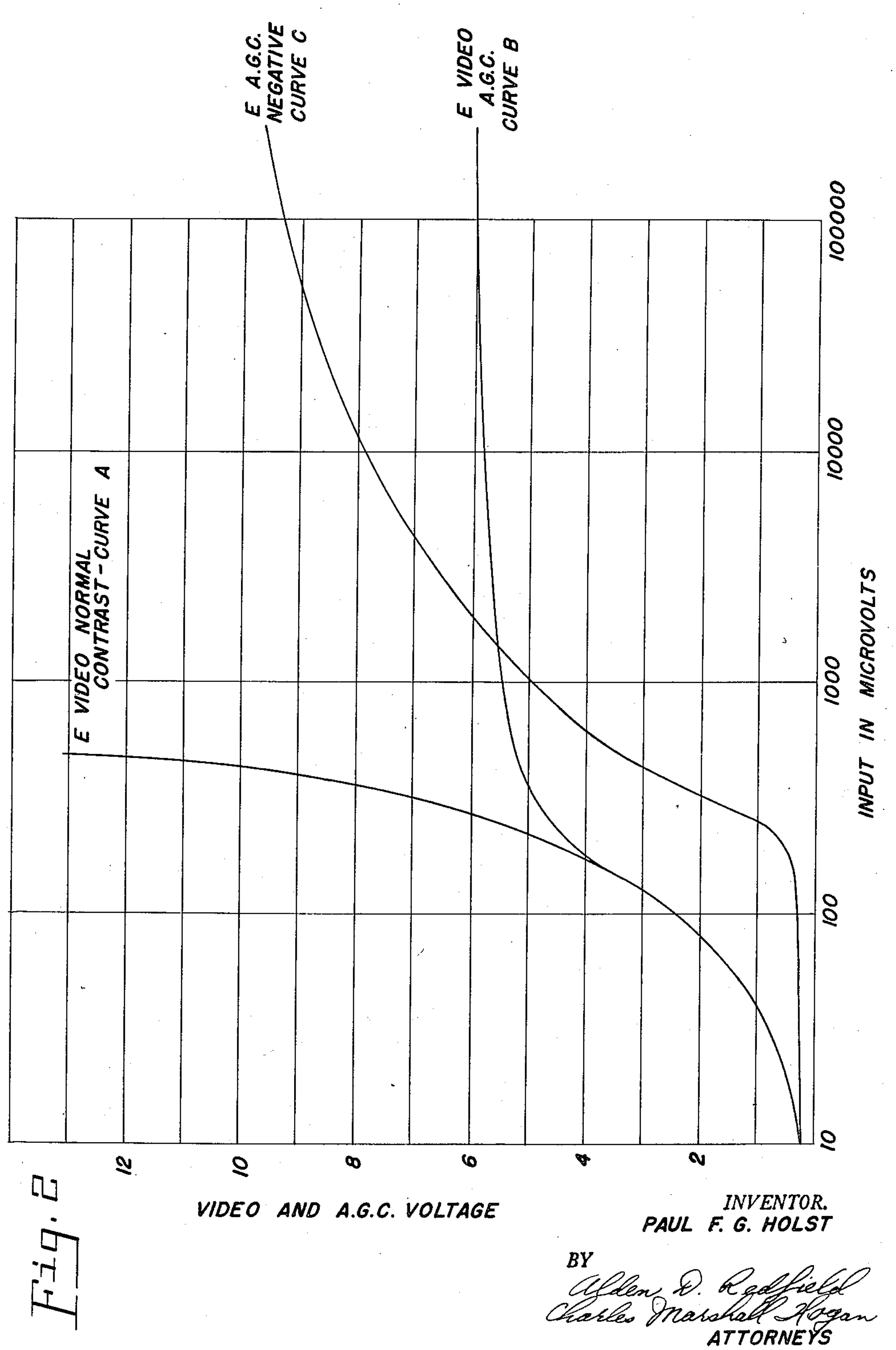

In the drawings Fig. 1 is a circuit schematic, partly in block form, showing a preferred form of my AGC system as adapted for use with an otherwise standard television receiver, and Fig. 2 is a set of performance curves employed in describing the operation of the invention.

In accordance with the invention, there is provided, in a television receiver which includes video stages to be controlled (such as 11 and 17), the combination of means including a rectifier coupled to the last stage and a double time-constant integration circuit (such as 100, 101, 102, 103, 105, 106) for developing an AGC potential proportional to the peak amplitude of the video signal, a source of line-frequency pulses of positive polarity (the existing damper 64 and pulse inverter 69 being utilized in this illustrative embodiment for developing such pulses), and triode rectifier means (107) controlled by said potential for developing by plate rectification an amplitude AGC potential. In accordance with one feature of the invention the application of the AGC potential to the controlled stages is delayed by a bias impressed on the cathode circuit of the triode pulse rectifier. At the outset particular attention is directed to those units and elements.

The specific description begins with a brief explanation of a typical channel which is controlled by an automatic gain control device in accordance with the invention. In the present illustrative disclosure, the novel automatic gain control is shown as incorporated in a type of television receiver known as the Crosley Model 348CP, and further described in Crosley Television Receiver Information Service Manual No. 353, published in 1948 by the Crosley Division, AVCO Manufacturing Corporation, Cincinnati, Ohio, copyright No. K24953. That receiver is of the superheterodyne type, and it includes the usual antenna, antenna input and oscillator modulator stages (not shown herein), the oscillator modulator being generally designated by the reference numeral 10 (Fig. 1). It will be understood that any suitable arrangements may be employed for the antenna, the local oscillator, the frequency converter, and the antenna input circuit. A suitable arrangement is specifically shown and described in the copending patent application of John D. Reid, entitled "Television Receiver System," Serial No. 785,303, filed November 12, 1947, now Patent No. 2,507,995, granted May 16, 1950, in the U. S. Patent Office and assigned to the same assignee as the present application and invention.

The frequency converting stage is coupled to a first intermediate frequency amplifying stage 11 as by a double-tuned input circuit including a transformer 12, the primary of which may be resonated by a capacitor 13, and the secondary of which may be tuned by a capacitor 14. The trap circuits provided for attenuating the video carrier on the adjacent undesired higher channel and the sound carrier on the adjacent undesired lower channel have been omitted herein as not necessary to a description of the present invention. The first intermediate frequency amplifier 11 also includes an amplifier tube 15 having an input electrode circuit coupled to the secondary of transformer 12. The anode or output circuit of tube 15 is coupled through a double-tuned circuit including transformer 16 to a second intermediate frequency amplifier 17. The primary of transformer 16 may be resonated by the output capacity of tube 15 and the distributed circuit capacities, and the secondary may be resonated by the input capacity of tube 18 and the distributed circuit capacities, the control electrode input circuit of tube 18 being coupled to the secondary of this transformer by a capacitor 19.

The cathodes of tubes 15 and 18 respectively are provided with unby-passed self-biasing resistors 20 and 21, respectively. The control electrode of tube 15 is returned through a resistor 22 to an AGC line 23, and the control electrode of tube 18 is returned through a resistor 24 to this AGC line, the control potentials being filtered by a shunt capacitor 111 and developed by an automatic gain control circuit provided in accordance with the present invention. The invention concerns itself with the means and method by which the AGC potentials are derived and applied to the controlled tubes through line 23. The AGC potential applied to tube 15 is further filtered by shunt capacitor 25.

In the above-referred-to Crosley receiver the sound channel, herein omitted, is coupled to the primary of transformer 16, and there is provided at the secondary of transformer 16 a circuit arrangement for attenuating the adjacent sound carrier, herein omitted as not pertinent to the present invention.

The video IF signal is applied to the third IF amplifier 26 by a coupling circuit comprising inductor 27 and capacitor 28, this amplifier also including a tube 29. Inductor 27 is resonated by the output capacity of tube 18 and the input capacity of tube 29, and an absorption trap circuit (not shown) may be provided if desired further to attenuate the separated sound IF signal.

The output of amplifier 26 is coupled to an inductor 30 and a capacitor 31 to a fourth intermediate frequency amplifier 32, comprising a tube 33 having a grid resistor 34 and a cathode resistor 35 by-passed by a capacitor 36. The last intermediate frequency amplifier stage 32 is coupled as by a transformer 37 to a crystal rectifier detector network 38. This network is of conventional character and includes a load resistor 39, across which the composite derived video and synchronizing signals appear, a series peaking inductor 40, a series peaking inductor 41, and capacitors 42, 43, and 44. Inductor 41 resonates at the IF frequency to filter out the IF signals.

In the foregoing description, and in fact throughout this disclosure, screen grids, wave traps, filters, and other circuit elements which need not be shown in order to illustrate or to disclose or describe the present invention or an appropriate background for the invention are omitted for purposes of simplicity and clarity, so far as practicable. Pentodes are shown as triodes to avoid unnecessary discussion of screen grid circuits.

The composite video signal is fed from the detector 38 into a cathode follower stage 45 which comprises a tube 46 having an input circuit coupled to the detector load resistor 39 and also having a cathode resistor 47. The cathode resistor 47 is coupled by a line 48 to the video amplifier and D. C. restorer stages and ultimately to the picture tube. It is additionally coupled to a conventional synchronizing separator device indicated by the reference numeral 49, which functions in the usual manner to separate the synchronizing signals from the video signals and then to separate the horizontal synchronizing signals from the vertical synchronizing signals. The separating device 49 has an output circuit comprising a lead 50 which is connected to the vertical deflection system (not shown). It also has an output circuit comprising a grounded terminal 51 and a high potential terminal 52 which develops pulses of negative polarity applied to an inverter stage 53.

Those above-described elements which begin with the reference numerals 11 and 14 and end with the numeral 48 collectively show the channel which is controlled and the significant elements of that channel between the antenna input stage (not shown) and the video amplifier and picture tube stages (not shown). In short, these elements show that which is controlled.

It will be understood that the invention is not confined to this specific type of controlled channel but may be utilized in any television receiver environment wherein AGC is desired.

This novel automatic gain control employs keying, and the description now proceeds to a discussion of the arrangement by which the keying pulses are developed.

It will be understood that the sync separator 49 comprises the usual integrating circuit for separating out the vertical synchronizing pulses and differentiating circuit for separating out the horizontal pulses of line frequency. The output of the last-mentioned or differentiating circuit is coupled to the input of an inverter stage 53 which comprises a tube 54 having a grid resistor 55 and a cathode resistor 56. The anode and cathode of this tube are separately coupled as by capacitors 57 and 58 to an anode 59 and a cathode 60 of a double diode AFC detector tube, both diodes of which are arranged in series. Between anode 59 and cathode 60 are connected a pair of resistors 61 and 62, the junction of which is connected to the input of a multivibrator stage 63. The arrangement of inverter 53 is such that pulses are periodically applied at line frequency with positive polarity to anode 59 of AFC detector stage 64 and with negative polarity to cathode 60 of that stage. In other words, the synchronizing signals from sync separator 49, as translated by inverter 53, are effectively applied with like polarity to both diodes of stage 64, for the purpose of periodically keying the diodes into conductivity. There are also applied to these diodes with differential polarities sawtooth signals developed by integration of pulses obtained from the plate circuit of damper tube 64. For this purpose, the plate of damper tube 64 is coupled through a network comprising series resistors 65 and 66, capacitor 67 and grid resistor 68 to the input circuit of a pulse inverter tube 69, the plate of this tube being coupled through an integrating circuit, comprising resistor 70 and capacitor 71, and a coupling capacitor 72 to cathode 73 and anode 74 of the AFC detector stage 64. The AFC detector derives a D. C. output voltage, appearing across resistors 61 and 62, which has a magnitude and polarity functionally related to the relative phases and direction of phase lag or lead of the sawtooth signals, representing the integrated pulses obtained from tube 64, and the synchronizing pulses translated to the AFC detector stage by inverter 53. Automatic frequency control systems of this general character are disclosed in various publications and patents, including the patent of Karl R. Wendt entitled "Television System," assigned to the Radio Corporation of America, U. S. Patent No. 2,358,545.

It will be seen that the horizontal deflecting system selected for purposes of illustration is of the indirect sync type, the D. C. potential output of detector 64 being filtered by shunt capacitor 78 and applied to the input of a cathode-coupled multivibrator stage 63. For a description of the details of multivibrator 63, reference is made to the following patents and publications: U. S. Patent No. 2,461,871, Harland A. Bass, assigned to the AVCO Manufacturing Corporation, issued February 15, 1949, entitled "Relaxation Oscillator Capacitance Multiplier"; U. S. Patent No. 2,157,434, James L. Potter, issued May 9, 1939; the article by J. L. Potter, pages 713 et seq., Proceedings of the Institute of Radio Engineers, June 1938, volume 26, No. 6, published by the Institute of Radio Engineers at New York, New York.

The multivibrator comprises a pair of tubes 75 and 76, a common cathode resistor 77, a filter capacitor 78, and RC feedback network 79, 80, a coupling network 81, 82, a pair of plate load resistors 83, 84, and a discharge capacitor 85. The output of the multivibrator is coupled to the input circuit of tube 86 of amplifier stage 87, by a coupling network comprising capacitor 88, series resistor 89, and grid resistor 90. Self-bias for the cathode of the output tube is provided by bias resistor 91, by-passed by capacitor 92.

The anode circuit of output tube 86 begins at the anode, then progresses successively through the primary 93 of the output transformer, conductor 94, booster capacitor 95, the secondary of the output transformer (this portion being paralleled by the cathode-anode circuit of damper tube 64), and the horizontal deflecting coils 96A, 96B to a sliding contact on a potentiometer 97, finally to a source of space current (not shown).

The horizontal output stage is conventional and is coupled by transformer 93 to the horizontal deflection coils 96A, 96B, the latter being shunted by a series combination of damper triode 64 and booster capacitor 95. The grid of the triode 64 is capacitively coupled by inherent interelectrode capacitance to the anode of that tube and is connected through a dropping resistor 98 to a space current source (not shown).

The construction and operation of the circuit elements shown within the block 99 is well known to the art, the theory being discussed in the following patents and publications:

Magnetic Deflection Circuits, Otto H. Schade, RCA Review, September, 1947, volume VIII, No. 3, pp. 506 et seq.;

U. S. Patent 2,280,733, Tolson;

U. S. Patent 2,382,822, Schade;

U. S. Patent 2,460,540, Shaw.

Those circuit elements function in such a way that the following events occur: When tube 86 becomes nonconductive at the end of the trace period, the magnetic field in deflecting coils 96A, 96B collapses and the energy appears in the form of a charge across the inherent circuit capacity of the yoke system. After one half cycle of free oscillation in the resonant circuit made up of the coils 96A, 96B and the inherent capacity, the yoke current is built up to a maximum in a direction opposite to the maximum current immediately before retrace, the magnetic field then having reversed. Tube 64 then becomes conductive and the next trace begins, the magnetic energy being dissipated across tube 64 and capacitor 95 being charged to feed back some of the energy to the D. C. source. As the reversed current through the yoke approaches the zero axis, tube 86 again becomes conductive and trace continues. The control electrode circuit of tube 64 is coupled to the anode in such a way that the tube acts as a negative resistance, with resultant improvement in linearity of the deflection current.

The elements beginning with the reference numerals 53 and 73 and ending with the reference numerals 64 and 99 are herein shown for background purposes.

The stage 99 is used in the automatic gain control system of the present invention to provide a source of negative pulses. These pulses are developed at the anode of tube 64 during the retrace periods, when both output tube 86 and damper tube 64 are nonconductive.

Referring now specifically to the automatic gain control in accordance with the present invention, it comprises the following principal circuits: First, a peak-rectifier for deriving a control voltage, the rectifier having a fast time-constant load circuit; second, a filter circuit having a long time constant, at the output of which a rectified voltage of positive polarity appears; third, a pulse rectifier stage controlled by the last-mentioned control voltage. The control voltage appearing at the pulse rectifier output is directly proportional to the peak magnitude of the video intermediate frequency signals. A delay bias is impressed on the cathode circuit of the triode pulse rectifier tube. This tube is periodically keyed into conductivity by pulses from damper tube 64, amplified and inverted by pulse inverter tube 69. The control voltage output of the triode pulse rectifier is applied to the control electrodes of tubes 15 and 18 in the first and second IF amplifier stages, in order to control the gain of the video channel.

In the AGC circuit in accordance with the invention, the control voltage appears at the output of the controlled triode pulse rectifier, with the following advantages:

First, control voltages of great amplitude are obtained without the necessity of operating the output stage 32 of the video IF amplifying system at a higher level than that required for adequate video signals;

Second, the video output is held at a substantially constant level independent of variations in the input carrier signal voltage;

Third, the limitations of the usual direct-current amplifier—such as difficult voltage requirements, instability, and susceptibility to anode supply voltage changes—have been overcome.

Specifically, a germanium peak rectifier network comprising a rectifier 100, resistor 101, capacitor 102, and resistor 103, is coupled, as by a capacitor 104, to the anode circuit of the last video IF tube 33. A filtered rectified voltage appears across resistor 103 with positive polarity, the junction of the rectifier anode and the ungrounded terminal of resistor 101 being connected to coupling capacitor 104, resistor 103 and capacitor 102 being connected between the cathode of the germanium rectifier and ground. The short time constant of the network 102, 103 preferably approximates the duration of one horizontal line or 60 microseconds.

The rectified voltage appearing across resistor 103 is filtered by means of a relatively long time-constant circuit, comprising a series resistor 105 and a shunt capacitor 106, which preferably has a time constant of 0.05 second or more, 0.066 second being preferred, the resistor 105 being connected between the ungrounded terminal of resistor 103 and the grid of a triode pulse rectifier tube 107, the capacitor 106 being shunted across the input of this tube.

The time constant of the peak rectifier load network 102, 103 is such that the voltage appearing across resistor 103 is a function of the peak (synchronizing pulse) value of the video IF signal appearing at the plate of tube 33 and is substantially independent of picture content. The fast time constant of this circuit renders the AGC control voltage substantially independent of occasional noise pulses. The capacitance of capacitor 102 is low, and therefore the energy stored in it by occasional noise pulses is small. The D. C. component of the noise pulses is therefore small. The peak rectifier time constant may be as low as one horizontal line or as high as five lines. The shorter time constant is preferred, because it decreases the noise susceptibility of the system.

The second time-constant circuit 105, 106 filters out the A. C. component of noise energy, the 60 cycle vertical synchronizing pulse components and the A. C. component resulting from the fast charge and slow discharge of capacitor 102 which occur at line frequency. The time constant of this circuit should be at least 0.05 second. A double time constant integration circuit for improving noise immunity is per se a part of the prior art. However, so far as I am aware, no one has, before my invention, conceived the use of such a circuit to control the rectification of line-frequency pulses, whereby to provide a negative AGC control voltage. It is customary to apply the output of a double time-constant integration circuit directly to the grids of the controlled IF amplifier tubes.

The voltage output of the double time-constant integration network is of positive polarity as applied to the control electrode of pulse rectifier triode 107.

Horizontal line pulses are applied to tube 107 in the following manner: The plate circuit of damper tube 64 is coupled to the grid circuit of pulse inverter tube 69 by series resistors 65 and 66, coupling capacitor 67 and grid resistor 68, so that the negative pulses of line frequency appearing at the anode of damper tube 64 are amplified by tube 69 and appear at the plate circuit of the latter as positive pulses of line frequency. These positive pulses of line frequency are applied, through a capacitor 108 intercoupling the plates of tubes 69 and 107, to the anode circuit of tube 107, whereby the latter tube is periodically keyed to conductivity to rectify the pulses applied to its plate.

The triode pulse rectifier tube 107 is provided with a load resistor 109, between its anode and ground, and load resistor 109 is coupled to a filter circuit comprising series resistor 110 and shunt capacitor 111. The output of this filter network is connected to the control electrode of controlled IF amplifiers 11 and 17 by the AGC line 23 and resistors 22 and 24. This filter steadies the pulsating voltage output of tube 107.

It will be seen that the detector in the present AGC circuit operates to develop a positive voltage. This voltage is used to control rectification of pulses in synchronism with and derived from the horizontal pulses which control horizontal retrace. In this illustrative embodiment, the circuit comprising damper tube 64 and pulse inverter tube 69 was chosen as a convenient source of pulses to be rectified. It is within the spirit of the invention, generically, to employ any source of line frequency pulses for keying the rectifier tube 107 or equivalent.

Tube 107 is provided with a cathode biasing resistor 112, bypassed by a capacitor 113, the biasing resistor 112 being connected, for purposes of delayed AGC, to the positive terminal of a source of potential (not shown).

The curves of Fig. 2 are referred to in describing the operation of the invention. When no video IF signal is present, the germanium rectifier 100 does not rectify and the control grid voltage on pulse rectifier tube 107 is zero. The cathode resistor 112 is so proportioned that anode current is prevented from flowing in tube 107 at the peaks of the pulses from tube 69, when the grid of tube 107 is at ground potential. Under this condition plate rectification does not occur in tube 107 and the AGC control voltage between line 23 and ground is zero, the gain of IF amplifier stages 11 and 17 then being at a maximum.

When video IF signals are present, a positive voltage proportional to the peak magnitude thereof is applied to the grid of the pulse rectifier tube 107, but plate rectification in that tube does not take place unless the output of the system, including the video IF amplifiers and the germanium rectifier and the double time-constant integration network, is of sufficient magnitude to permit rectification during the peaks of the pulses applied to the plate of tube 107.

The cathode bias on the triode AGC amplifier, obtained by a voltage divider from B, is of such a large value that the tube is biased beyond cutoff at zero video IF signal. The magnitude of this bias beyond cutoff determines the delay in the AGC action. The larger the value of the cathode bias, the farther beyond cutoff the triode is biased. Hence a greater magnitude of video IF signal is required to start the AGC action. The farther beyond cutoff the triode is biased, the greater is the AGC delay.

Pulses from the pulse inverter are applied to the plate of the triode. Depending upon the magnitude of the positive rectified voltage applied to the grid of the triode, anode rectification of the pulses may occur.

No rectification, however, will occur until the positive rectified voltage applied to the triode grid exceeds the delay voltage. From this point, the voltage produced by anode rectification is a function of the control grid voltage. As the control grid positive rectified voltage increases, the voltage produced by anode rectification increases. Since the AGC tube is a triode, amplification is obtained. Also, since the positive rectified control grid voltage is proportional to peak magnitude of the video IF signal and the voltage produced by anode rectification is a function of the positive rectified voltage applied to the control grid of the triode, the voltage produced by anode rectification is a function of the peak magnitude of the video IF signal. The voltage produced by anode rectification is "smoothed" in an R.-C. network 110, 111 with a time constant of 0.1 second. The output of this integrating network is a negative voltage suitable for automatic gain control.

The delay in applying AGC control voltage to stages 11 and 17 is functionally related to the minimum voltage, which, when applied to the grid of tube 107, causes plate rectification therein. The AGC potential is prevented from lowering the gain of the video channel until the output of the video detector is sufficiently to insure full contrast. The delay may be changed by a change in the positive voltage applied to the cathode of tube 107.

After the video signal and the voltage applied to the grid of the triode pulse rectifier 107 have reached a magnitude which "overcomes the delay," that voltage, so applied to the grid of tube 107, is amplified, resulting in the development of a strong AGC voltage which maintains the output of the video channel at a more constant level.

Curve A of Fig. 2 shows the video detector (unit 38) output for the receiver without AGC, input signal in microvolts being plotted as abscissae against video voltage as ordinates in a frame of Cartesian coordinates. Curve B shows the video detector output when AGC according to the invention is employed. Curve C shows the negative control voltage applied to the grids of tubes 15 and 18. It will be noted that the sensitivity of the receiver is not affected until the "delay has been overcome."

The following circuit parameters are furnished as illustrative and not as limitations. They were found to be satisfactory.

Oscillator modulator 10: As described in the copending patent application of John D. Reid, referred to above.
Capacitor 13: 12 mmf., 600 v.
Capacitor 14: 56 mmf., 500 v.
Capacitor 25: 0.005 mfd., 500 v.
Capacitor 19: 15 mmf., mica
Capacitor 28: 180 mmf., 500 v.
Capacitor 31: 150 mmf., mica
Capacitor 36: 0.001 mfd., 600 v.
Capacitor 42: 4.7 mmf., 500 v.
Capacitor 43: 10 mmf., 500 v.
Capacitor 44: 10 mmf., 500 v.
Capacitor 67: 0.01 mfd., 600 v.
Capacitor 104: 100 mmf.
Capacitor 102: 180 mmf.
Capacitor 108: 0.02 mfd.
Capacitor 111: 0.1 mfd.
Capacitor 106: 0.02 mfd.
Capacitor 113: 4.0 mfd.
Capacitor 71: 0.005 mfd., 600 v.
Capacitor 72: 0.005 mfd., 600 v.
Capacitor 57: 0.001 mfd., 600 v.
Capacitor 58: 0.001 mfd., 600 v.
Capacitor 80: 0.1 mfd., 600 v.
Capacitor 78: 0.025 mfd., 200 v.
Capacitor 81: 82 mfd., 500 v.
Capacitor 85: 150 mmf., mica
Capacitor 92: 0.1 mfd., 600 v.
Capacitor 95: 4 mfd., mica Multivibrator 63: As described in the patent of Harland A. Bass, referred to above.

Tube 15: Type 6AC7
Tube 18: Type 6AC7
Tube 29: Type 6AC7
Tube 33: Type 6AC7
In detector 38: Type IN34 crystal rectifier
Tube 46: Half of 6SN7GT
Tube 69: Half of 6SN7GT
Tube 107: Half of 6SN7GT
Rectifier 100: Type IN34 germanium rectifier
Tube 54: Half of 6SN7GT
In AFC detector: 6H6
Tube 75: Half of 6SN7GT
Tube 76: Half of 6SN7GT
Tube 86: 6BG6G
Tube 64: 6AS7G Transformers and sync separator and deflection yoke: As specified in Crosley Television Receiver Information Service Manual No. 353

Resistor 22: 220,000 ohms, 0.5 watt
Resistor 24: 220,000 ohms, 0.5 watt
Resistor 20: 47 ohms, 0.5 watt
Resistor 21: 47 ohms, 0.5 watt
Resistor 34: 470,000 ohms, 0.5 watt
Resistor 35: 120 ohms, 0.5 watt
Resistor 39: 3900 ohms, 0.5 watt
Resistor 47: 1000 ohms, 0.5 watt
Resistor 65: 150,000 ohms, 0.5 watt
Resistor 66: 150,000 ohms, 0.5 watt
Resistor 68: 18,000 ohms, 0.5 watt
Resistor 101: 56,000 ohms
Resistor 103: 330,000 ohms
Resistor 105: 3.3 megohms
Resistor 109: 150,000 ohms
Resistor 110: 1 megohm
Resistor 70: 47,000 ohms, 0.5 watt
Resistor 55: 100,000 ohms, 0.5 watt
Resistor 56: 1500 ohms, 0.5 watt
Resistor 61: 100,000 ohms, 0.5 watt
Resistor 62: 100,000 ohms, 0.5 watt
Resistor 79: 82,000 ohms, 0.5 watt
Resistor 83: 47,000 ohms, 1 watt
Resistor 84: 1 megohm, 0.5 watt
Resistor 114: 100,000 ohms, 0.5 watt
Resistor 77: 1000 ohms, 0.5 watt
Resistor 82: 470,000 ohms, 0.5 watt
Resistor 89: 100 ohms, 0.5 watt
Resistor 90: 1 megohm, 0.5 watt
Resistor 91: 100 ohms, 1 watt
Resistor 115: 55,000 ohms, 1 watt
Resistor 98: 297,000 ohms, 0.5 watt
Resistor 116: 1000 ohms, 0.5 watt
Resistor 117: 1000 ohms, 0.5 watt
Resistor 118: 1000 ohms, 0.5 watt
Resistor 120: 15,000 ohms, 2 watts
Resistor 121: 1000 ohms, 0.5 watt While there has been shown and described what is at present considered the preferred embodiment of the present invention, it will be obvious to those skilled in the art that various modifications and substitutions of equivalents may be made without departing from the true scope of the invention as defined by the appended claims.

I claim:

1. An automatic gain control circuit for a television receiver video channel of the type including gain-controlled stages comprising means coupled to an intermediate-frequency output circuit of said channel for developing an AGC potential of positive polarity having a magnitude proportional to the peak amplitude of the received video signal, said means consisting of a rectifier element and a $\pi$-type load network for said rectifier element, the input shunt arm of said network comprising a first capacitor and a first resistor in parallel relation but in series with said rectifier element, the time constant of said first resistor and capacitor being of the order of 63.5 microseconds or one line period, the series arm of said network comprising a second resistor and the output shunt arm of said network comprising a second capacitor, the time constant of said second resistor and capacitor being greater than one frame period and at least 50,000 microseconds, said AGC potential being the rectified voltage output appearing across the output shunt arm of said network, a source of line-frequency pulses of positive polarity, pulse inverter means including an electron tube having a control electrode coupled to said output shunt arm and an anode coupled to said source, said tube being controlled by said AGC potential for anode-rectifying said pulses, and means including a filter providing a load for said anode for utilizing the output pulses of said tube to control the gain of said channel.

2. An automatic gain control circuit for a television receiver video channel of the type including electron tubes having control elements comprising means coupled to the intermediate-frequency output of said channel and including a peak-rectifier with a cathode resistance-capacitance load having a fast time constant of the order of one line period followed by a cascaded series resistor-shunt capacitor filter network having a long time constant of at least 0.05 second, for developing an AGC potential having a magnitude proportional to the peak amplitude of the received video signal, a source of line-frequency pulses of positive polarity, electron-tube pulse-rectifier means including a control electrode coupled to said filter network and an anode coupled to said source, said pulse rectifier means being responsive to and controlled by said AGC potential for anode-rectifying said pulses, thereby to invert said pulses, and means including a filter network in the anode circuit of said pulse rectifier means for applying the output signals of said pulse rectifier means to the control element of each automatic-gain-controlled tube in said channel.

3. An automatic gain control circuit in accordance with claim 2 wherein the first-named means is coupled to said video channel by a series coupling capacitor and shunt resistor, said resistor being connected to the anode of the peak rectifier.

4. A delayed automatic gain control circuit for a television receiver video channel comprising means coupled to the intermediate-frequency output of said channel and including a rectifier and a double time-constant $\pi$-type rectifier load network for developing an AGC potential of positive polarity having a magnitude proportional to the peak amplitude of the received video signal, the input shunt arm of said network comprising a first capacitor and a first resistor in parallel relation but in series with said rectifier element, the time constant of said first resistor and capacitor being of the order of one line period or 63.5 microseconds, the series arm of said network comprising a second resistor and the output shunt arm of said network comprising a second capacitor, the time constant of said second resistor and capacitor being greater than one frame period and at least 50,000 microseconds, said AGC potential being the rectified voltage output appearing across the output shunt arm of said network, a source of line-frequency pulses of positive polarity, triode-rectifier means having a control electrode which is coupled to said output shunt arm and a cathode and an anode which is coupled to said source, said triode being responsive to and controlled by said AGC potential for anode-rectifying said pulses, means including a filter for utilizing the output pulses of said triode rectifier means to control the gain of said channel, and means for impressing a positive bias on said cathode impedance to delay such control until the video carrier signal has attained a predetermined level.

5. In a television receiver adapted to receive a television signal having predetermined line and frame periods each approximating 63.5 microseconds and 33,400 microseconds, an automatic gain control circuit comprising a video signal detecting rectifier element, a $\pi$-type load network for said rectifier element, the input shunt arm of said network comprising a first capacitor and a first resistor in parallel relation, the time-constant product of the values of said first resistor and capacitor being on the order of one line period or 63.5 microseconds, the series arm of said network comprising a second resistor and the output shunt arm of said network comprising a second capacitor, the time-constant product of said second resistor and capacitor being greater than one frame period and at least 50,000 microseconds, means for applying an intermediate-frequency carrier wave to said rectifier element, said carrier wave being amplitude modulated with both picture and synchronizing intelligence, a pulse source and pulse rectifier means having an input electrode coupled to the output shunt arm of said network and an anode coupled to said pulse source, said rectifier means being controlled by the rectified voltage developed across said output shunt arm, and means including a filter for utilizing the output voltage of the pulse rectifier to control the gain of said television receiver.

6. In a television receiver adapted to receive a television signal having predetermined line and frame periods each approximating 63.5 microseconds and 33,400 microseconds, an automatic gain control circuit comprising a video signal detecting rectifier element, a $\pi$-type load network for said rectifier element, the input shunt arm of said network comprising a first capacitor and a first resistor in parallel relation, the time-constant product of the values of said first resistor and capacitor being of the order of one line period, the series arm of said network comprising a second resistor and the output shunt arm of said network comprising a second capacitor, the time-constant product of said second resistor and capacitor being greater than one frame period, means for applying an intermediate-frequency carrier wave to said rectifier element, said carrier wave being amplitude modulated with both picture and synchronizing intelligence, a pulse source and pulse rectifier means coupled to the output shunt arm of said network and an anode coupled to said pulse source, said rectifier means being controlled by the rectified voltage developed across said output shunt arm, and means including a filter for utilizing the output voltage of the pulse rectifier to control the gain of said television receiver.

PAUL F. G. HOLST.

(References on following page)

REFERENCES CITED

The following references are of record in the file of this patent:

UNITED STATES PATENTS

| Number | Name | Date |
|---|---|---|
| 2,227,056 | Blumlein et al. | Dec. 31, 1940 |
| 2,230,295 | Holmes | Feb. 4, 1941 |
| 2,266,731 | Andrieu | Dec. 23, 1941 |
| 2,300,942 | Lewis | Nov. 3, 1942 |
| 2,307,375 | Blumlein et al. | Jan. 5, 1943 |
| 2,402,096 | Somers | June 11, 1946 |
| 2,498,839 | Hayward | Feb. 28, 1950 |
| 2,520,012 | Montgomery | Aug. 22, 1950 |

FOREIGN PATENTS

| Number | Country | Date |
|---|---|---|
| 845,897 | France | Sept. 4, 1939 |
| 851,899 | France | Jan. 16, 1940 |